Patented Mar. 30, 1937

2,075,251

UNITED STATES PATENT OFFICE 2,075,251

TREATMENT OF STABILIZED RUBBER DERIVATIVES

Herbert A. Winkelmann, Chicago, Ill., assignor to Marbon Corporation, a corporation of Delaware No Drawing. Application May 11, 1936, Serial No. 79,174

6 Claims. (Cl. 106—23)

This invention relates to halogen containing rubber derivative compositions and more particularly to the treatment of stabilized halogen containing rubber derivative compositions. It includes the milling, calendering, molding and extruding of such stabilized compositions into auxiliary products and into finished articles of manufacture. Among the articles of manufacture are tubes, gaskets and transparent wrapping paper.

The preparation of various halogen containing rubber derivatives has been known for many years. These materials include the rubber chlorides, chlorinated rubber hydrochloride and rubber hydrochlorides. Each is a distinct compound of markedly different structure and properties. The rubber chlorides are obtained by reacting rubber with chlorine which reacts by addition and by substitution with the rubber molecule. The chlorinated rubber hydrochlorides are obtained by reacting the rubber hydrochloride with chlorine, and are also partially substitution compounds. The halogenated compounds are distinguished by their high instability, and although many attempts have been made to produce chlorinated rubber of good stability such attempts have been only partially successful and the treatments of such compounds by milling, calendering, molding or extruding has always resulted in considerable decomposition and evolution of hydrogen chloride. By the present invention it is possible to so treat chlorinated rubber compounds with a much greater degree of success than has hitherto been accomplished but the chlorinated compounds are not the preferred compounds of this invention for I have found that the rubber hydrochlorides are much more capable of heat stabilization and can be milled, calendered, molded and extruded in the presence of heat stabilizers in a much more satisfactory manner than the rubber chlorides. The invention, therefore, is concerned primarily with the treatment of rubber hydrochlorides in the presence of heat stabilizers.

Rubber hydrochlorides are produced by reacting rubber with hydrogen chloride. The properties of the resulting product vary with the method and conditions of the reaction. In general, however, the product is an addition product of rubber and hydrogen chloride since the hydrogen chloride adds to the urbber at the double bonds of the rubber molecule. It is generally considered that rubber has the nuclear formula:

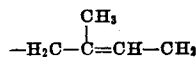

When the hydrogen chloride reacts with rubber a product of the following nuclear formula is obtained:

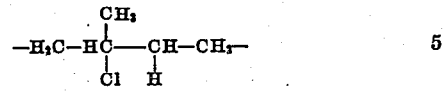

However, since the rubber molecular is very large and there are a number of double bonds present in a single molecule it is apparent that completely reacted (saturated) or partially reacted (partially saturated) rubber hydrochloride may be produced. It has further been discovered that if solid rubber is reacted with hydrogen chloride at —85° C. a rubber hydrochloride is obtained which, according to its X-ray pattern, is a stable amorphous compound, while if the rubber is reacted at room temperature a crystalline type of product is obtained. The amorphous rubber hydrochloride is further characterized by greater solubility, and lesser resistance to turpentine and oils, lower flow point and lesser heat stability than the crystalline type. Furthermore the crystalline type varies in solubility and flow point depending on the temperature at which the rubber was reacted. A highly insoluble rubber hydrochloride which is resistant to hot benzol, and only slightly affected by cold benzol is obtained by reacting solid rubber with gaseous hydrogen chloride at elevated temperatures such as 120° C. This high temperature reaction product is also characterized by a higher flow point than other types of rubber hydrochloride so that it is much more difficult to mechanically work and flux without substantial decomposition than rubber hydrochlorides of lower flow point.

In general all types of rubber hydrochloride are much more stable than the rubber chloride of like saturation. However, all types will decompose and disintegrate to a greater or less extent under the action of mechanical treatment and heat. Attempts to mill rubber hydrochlorides alone under ordinary milling conditions result in the material decomposing with evolution of hydrogen chloride and the formation of free acid in the products. Thin films made from such products are dark colored, flabby, contain free acid and otherwise are unsatiisfactory for wrapping purposes or other purposes. Molded masses made from rubber hydrochloride by ordinary hot molding methods are also dark colored and considerbaly decomposed, generally showing evidence of blowing and sweating. Although the French patent to Peachy No. 480,904 describes the calendering and molding of masses of rubber chloride compounds, such treatment of rubber chloride and rubber hydrochloride, and especially of the high chlorine containing or saturated compounds results in considerable decomposition, discoloration, and gives an acid exuding material. As far as is known by applicant, up to the present invention, light colored substantially undecomposed stable, nonacidic masses have been made solely by casting solutions of rubber hydrochloride or rubber chloride and allowing the solvent to evaporate.

It is an object of the present invention to stabilize halogen containing rubber derivatives subject to disintegration by heat and mechanical treatment, such as rubber hydrochloride, in such a manner that they can be readily treated in a mixing mill and blended with various ingredients similarly to typical rubber compounding.

It is a further object of this invention to stabilize rubber hydrochloride with a material having a refractive index similar to rubber hydrochloride so that transparent products may be produced therefrom.

Another object is to produce transparent material, including wrapping sheets, from halogen containing rubber derivatives without the use of a solvent and its subsequent evaporation.

Another object is to produce heat stable, oil and ozone resistant compositions and articles of manufacture comprising rubber hydrohalides.

A further object is to provide a means for milling, calendering, tubing and molding saturated, crystalline rubber hydrochlorides without substantially decreasing their oil and ozone resistance.

Other objects will become apparent on reading the specification.

In the present invention a halogen containing rubber derivative, in particular rubber hydrochloride, and preferably the substantially saturated type of rubber hydrochloride is mixed with a material which retards the decomposition and disintegration of the halogen containing compound under heat and mechanical treatment. I have found that various types of materials will inhibit the heat decomposition of halogen containing rubber derivatives and particularly the rubber hydrohalides. These materials which I call heat stabilizers are generally and preferably basic solid materials, but not all basic materials are heat stabilizers, and I have found that some non-basic materials may act as heat stabilizers. In general, however, basic stabilizers are preferred since there is less tendency toward sweating and development of acidity where basic stabilizers are present, an important factor in molded articles of manufacture.

Not all the stabilizers are equally effective and some must be used in larger amounts than others. Materials which are satisfactory for rubber hydrohalides are not all satisfactory for rubber chloride but, in general, in order to have appreciable stabilizing effect during ordinary milling of a rubber halide the stabilizers must be one of the best of the rubber hydrochloride stabilizers and must be used in considerably larger quantity than for the rubber hydrochloride. In general, for the milling, calendering, molding and extruding of rubber hydrochlorides the stabilizers need only be used in small quantities compared to the amount of rubber hydrochloride.

The stabilizing effect of various materials is determined by their ability to retard heat disintegration which in turn is evidenced by the evolution of hydrogen chloride gas, the formation of free hydrochloric acid in the rubber hydrochloride composition, the formation of dark colored decomposition products, the decrease in combined chlorine and increase in unsaturation together with lessening of stiffness, resiliency, oil and ozone resistance, in addition to other factors which may take place with excessive decomposition, such as blowing and sweating. In general materials which will prevent the evolution of hydrogen chloride gas during the fluxing of the rubber hydrochloride are materials which retard heat disintegration. However, one of the most important functions of a heat stabilizer is to prevent the formation of free hydrochloric acid and maintain the compositions and finished products in an acid free condition throughout the period of their usage under normal room temperatures.

Of the many materials which have been tested magnesium oxide has been found the most effective stabilizer. In two parts or more by weight per 100 parts by weight of rubber hydrochloride the light, finely powdered magnesium oxide will practically prevent evolution of hydrogen chloride gas from a saturated rubber hydrochloride throughout a fluxing treatment on hot mills for a period of over fifteen minutes. The resulting homogeneous milled product is light colored and stiff. It calenders into thin transparent sheets or it may be molded into strong, light colored articles of manufacture showing no evidence of blowing or sweating.

The following table gives an illustrative list of heat stabilizers divided into stabilizers and super-stabilizers. It is considered that any material which is 10 parts by 100 parts of amorphous saturated rubber hydrochloride will prevent gassing during fluxing on a mill is a good heat stabilizer. There are, however, some materials which will not only prevent or substantially retard gas evolution on milling and stabilize under normal three minute molding at 260° F., but which will prevent blowing, sweating, loss of tensile strength, hardness and increase in extensibility in rubber hydrochloride products molded at 280° F. for thirty minutes. These materials are designated as super-stabilizers.

TABLE I

*Stabilizers*

Magnesium oxide
Magnesium hydroxide
Magnesium carbonate
Magnesium stearate
Magnesium aluminate
Magnesium sulphide
Calcium oxide
Calcium hydroxide
Calcium stearate
Calcium sulphide
Calcium benzoate
Calcium carbonate
Barium monoxide
Barium dioxide
Barium carbonate
Barium sulphide
Sodium hydroxide
Sodium peroxide
Sodium benzoate
Sodium carbonate
Sodium polysulphide
Sodium monosulphide
Sodium stearate
Sodium oleate
Sodium citrate

Stabilizers—Continued

Disodium phosphate
Trisodium phosphate
Tetrasodium phosphate
Sodium glycerophosphate
Potassium hydroxide
Potassium polysulphide
Strontium carbonate
Strontium phosphate
Strontium sulphide
Dibasic ammonium phosphate
Quaternary ammonium base
Ammonium citrate
Lithium carbonate
Lead dust
Sublimed blue lead
Lead oxide (litharge)
Lead phosphate
Lead thiosulphate
Lead borate
Tellurium dust
Sulphur
Nickel phosphate
Nickel oxide
Aluminum oxide
Aluminum sulphide
Hexamethylene tetramine
Amyl amine
Guanidine carbonate
Amyl amine phosphate
Butyr aldehyde—aniline
Dibenzyl amine
Diphenyl guanidine carbonate
Diphenyl ethylene diamine
Tetramethyl diamino diphenyl methane
Heptaldeoxime
Benzoyl peroxide

Table II

Superstabilizers

Magnesium oxide
Magnesium carbonate
Calcium oxide
Disodium phosphate
Trisodium phosphate
Sodium polysulphide
Sodium monosulphide
Sodium stearate It will thus be apparent that heat stabilizers come from a large number of classes of compounds.

The basic magnesium compounds are of the greatest value. Magnesium oxide is a super heat stabilizer even in 5 parts per 100 parts by weight of rubber hydrochloride. Finely divided light magnesium oxide has, in addition to its stabilizing effect a pronounced stiffening and strengthening effect, and has such a similar index of refraction to rubber hydrochloride that mixtures of 20 parts by weight of MgO per 100 parts of rubber hydrochloride may be calendered into sheets which are transparent in .001" thickness. Magnesium hydroxide and magnesium carbonate are also among the best of the stabilizers. The magnesium soaps act as stabilizers and also plasticizers.

The basic alkali metal compounds are next to the magnesium compounds in value. Their oxides, hydroxides, carbonates and soaps act similarly to the corresponding magnesium compounds. Of these compounds the calcium carbonate is the least efficient, and the oxide the most efficient.

Of the alkali metal compounds the trisodium phosphate, disodium phosphate, and sodium glyceryl phosphate stand high in ability to stabilize and give transparent light colored masses, of high strength and stiffness. The soaps give flexible, soft masses.

The amines in general combine with the rubber hydrochlorides to give soft, plastic compositions. Of the amine compounds hexamethylene tetramine has little plasticizing effect and is a good stabilizer on the mill. The amines, however, in general are not efficient stabilizers at elevated temperatures.

Sulfur is a stabilizer which effectively retards evolution of hydrogen chloride during milling, and maintains tensile strength during normal molding. Lead dust, likewise is a stabilizer of good order.

There are many other compounds which have only a slight stabilizing action on the mill but which will, to a slight extent maintain a rubber hydrochloride free of acid condition during use at room temperatures. Such materials as aluminum oxide come within this class.

Some materials, even including some basic materials promote rather than retard the heat disintegration of rubber hydrochloride and are worse than useless in maintaining rubber hydrochloride composition free of hydrochloric acid during use. Zinc compounds in general fall within this class. Zinc oxide, zinc sulphide, and zinc dust have been found particularly detrimental. The iron compounds act similarly to the zinc compounds. Compounds of acidic nature such as titanium dioxide also are of no stabilizing value and often appear to promote acid evolution. This is likewise true of inert pigments such as carbon black, blanc fixe, kieselguhr, wood flour and the like.

I have been unable to predict with any degree of exactitude compounds which will be good stabilizers, poor stabilizers or actually harmful to stabilization. The fact that sulfur and also lead act as heat stabilizers indicates that the stabilization mechanism is something more than a simple neutralization of free hydrogen chloride. I believe that the stabilizing compounds actually combine with the rubber hydrochloride with the formation of a compound which is more stable than the straight saturated rubber hydrochloride itself. On the other hand the stabilizing action may be a binding of adsorbed, occluded or loosely held halogen or hydrohalogen, and it may be that the removal of free hydrochloric acid from the presence of rubber hydrochloride is itself sufficient to give a more stable compound capable of undergoing normal hot milling, calendering, molding and extruding without appreciable disintegration.

However, the exact mechanism of the stabilizing action is not known and I do not restrict myself to any particular theory of its action. By experiment I have discovered and have herein disclosed a large number of materials which are useful in retarding heat disintegration during milling, molding, calendering, extruding and during exposure to normal room temperatures. I have disclosed other materials which should be avoided.

By way of illustration of my invention the following example is given in which the heat stabilizer is magnesium oxide. It will be understood, however, that the magnesium oxide may be replaced with other heat stabilizers with results varying in accordance with the nature and ability of the stabilizers. For example the superstabilizers of Table II, which are oxides, hydroxides or carbonates more nearly approach the magnesium oxide in results. The compounds from the groups consisting of basic alkali earth metal compounds, basic alkali metal compounds, basic lead compounds, elemental sulfur and elemental lead are, in general, the preferred stabilizers. The other stabilizers hereinbefore mentioned are operable for some purposes such as low temperature milling but are not preferred.

The following example will, therefore, illustrate an important aspect of my invention:

Crepe rubber of .02" thickness was reacted with liquefied hydrogen chloride at —85° C. to obtain an amorphous soluble type, substantially saturated rubber hydrochloride of 29.9% chlorine content. This amorphous rubber hydrochloride was then milled for about 15 minutes on differential rolls at a temperature sufficient to flux and homogenize the product. A temperature of around 180° F. is sufficient. Copious quantities of hydrogen chloride gas were evolved throughout the milling. The product was then calendered into sheets of about ⅛" thickness. These were of brownish-black color and contained free acid. The sheets were cut to size, and flowed under heat and pressure into blocks of about $\frac{1}{16}$" thickness. The appearance, tensile strength percent elongation, and hardness was noted after a three minute molding at 230° F., a thirty minute molding at 260° F., sixty minutes at 260° F., ninety minutes at 260° F., and two hours at 260° F. The milling and molding treatments together with tests were repeated with various quantities of magnesium oxide (1 to 5 parts per 100 parts of rubber hydrochloride) added to the rubber hydrochloride. With one part of magnesium oxide the gas evolution throughout the milling was not appreciably retarded. With three parts of magnesium oxide there was gas evolution at the initial stages only of the milling. With four parts of magnesium oxide the gas evolution was practically prevented throughout the milling except to a slight extent at the start, while with 5 parts of magnesium oxide the prevention of gas evolution was complete. The physical characteristics of the milled product in general varied with increasing amounts of magnesium oxide in a similar manner to the gas evolution. A lightening of coloration and an increase in stiffness, however, was apparent even with the addition of two parts by weight of rubber hydrochloride. The tests on the molded products showed the stabilizing effect of the magnesium oxide in a very marked manner, particularly for the products which were exposed to 260° F. for thirty minutes or longer. For example, the straight rubber hydrochloride containing no magnesium oxide exposed to a heat of 260° F. for thirty minutes had a tensile strength of 1500 lbs. per sq. in., an elongation of 490%, and a hardness penetrometer reading of 50. The homogeneous fluxed mixture of 100 parts rubber hydrochloride and 5 parts magnesium oxide exposed to a heat of 260° F. for thirty minutes had a tensile strength of 4700 lbs. per sq. in., an elongation of about 5%, and a hardness penetrometer reading of 9. The 100 part rubber hydrochloride, 5 part magnesium oxide mixture had the ability to main its high tensile strength, low elongation, and hardness even after heat treatment of 90 minutes at 260° F. At higher temperatures and longer intervals of heat treatment, however, the magnesium oxide mixtures slowly approached the unstabilized products, but were different in many ways than the straight heat treated rubber hydrochlorides. Tests with the other stabilizers in place of magnesium oxide showed varying stabilization ability, all less than that of magnesium oxide, varying from the high stabilizing ability of the superstabilizers to the low stabilizing ability of aluminum oxide.

The following example will illustrate the invention as applied to stabilizing partially saturated rubber hydrohalides:

A 4% solution of rubber in benzol was treated with hydrogen chloride gas until a reaction product was obtained having 15% of chlorine on the basis of the rubber hydrochloride. The solution of partially saturated rubber hydrochloride was steam distilled to obtain the solid partially saturated rubber hydrochloride. This product was then fluxed on differential rolls. There was little evolution of hydrogen chloride during milling but there was some heat disintegration as evidenced by the acidity of the product. The milling was then repeated on a mixture of the partially saturated rubber hydrochloride 100 parts, and magnesium oxide 10 parts. The heat disintegration was effectively retarded and appeared to be prevented entirely. The product was nonacidic and of lighter color than the unstabilized material. From the point of view of oil resistance, hardness and low elongation, however, the products of low saturation whether stabilized or unstabilized are of little value compared to the substantially saturated rubber hydrochlorides.

The following example will illustrate the invention as applied to rubber halides:

A rubber chloride of 68% chlorine content was put on an external mixing mill, and a milling of the material attempted. The rubber chloride gave off copious amounts of hydrogen chloride and burnt to a black powdery charcoal like mass. It could not be made into a fluxed integral mass and could not be sheeted. The milling was then repeated using 30 parts of magnesium oxide with 100 parts of rubber chloride. The mixture could be milled but could not be made into a homogeneous fluxed mass capable of sheeting. Rosin in about 10 parts by weight was then added. This material acted as a homogenizing agent so that the product could be "made" on the mill, and sheeted. Other homogenizing agents may be used such as ester gums, shellac, cumar and the like. The magnesium oxide effectively retarded and practically prevented the evolution of hydrogen chloride gas. Other evidence of stabilizing action was the lightness in color of the sheeted product. However, the weakness and brittleness of the mass makes the product of little value for molding and like purposes compared to rubber hydrohalides. With rubber chlorides of lesser chlorine content such as, for example, 30% chlorine, a product is obtained which is more readily milled and molded but such products are soft, tacky, of low oil resistance and high elongation, the poor qualities being enhanced by nonstabilization.

The following example will illustrate the invention as applied to the use of sulfur as a stabilizer.

A saturated rubber hydrochloride obtained by reacting rubber in sheet form with gaseous hydrogen chloride was placed on an external mixer, and prior to fluxing an amount of powdered sulfur in the proportion of 7 parts by weight sulfur to 100 parts by weight of rubber hydrochloride was dusted over the rubber hydrochloride. The materials were then milled together at a temperature sufficient to flow or flux the rubber hydrochloride. There was slight gassing which, however, was apparently less than when sulfur was not used. The product was calendered into a sheet. The color of this sheet was noted as lighter in color than the sheet obtained from straight rubber hydrochloride. The rubber hydrochloride sulfur sheet was then molded at a temperature of 268° F. for 1 hour. The product showed a tensile strength of 4600 lbs., an elongation of 50, and a hardness Pusey & Jones penetrometer reading of 7. This compared favorably with a similarly molded product of straight rubber hydrochloride which showed a tensile strength of 2900 lbs., an elongation of 543, and a hardness of 15. In order to check the stabilizing action of the sulfur a run was made in which the sulfur was added at the end of the milling operation. The product was molded at 260° F. for one hour, and showed a lower tensile strength, much greater elongation, and a high increase in softness over the product in which the sulfur was added first. The conclusions, therefore, are that sulfur is a non-basic heat stabilizer for milling, calendering and molding of halogen containing rubber derivative. At higher temperature than 260° F. and for longer intervals than one hour the sulfur acts predominantly as a vulcanizing agent as described in my copending application Serial No. 22,431, filed May 20, 1935.

The following example illustrates the invention as applied to the manufacture of transparent self sustaining wrapping sheets:

Example I

| | Parts by weight |
|---|---|
| Substantially saturated crystalline rubber hydrochloride of 32% chlorine content | 100 |
| Magnesium oxide | 3 |
| Hexamethylene tetramine | 2 |
| Butyl stearate | 5 |
| Paraffin wax | 0.5 |
| Petrol blue | .005 |

The magnesium oxide in this formula may be widely varied. As the proportion goes beyond 20 parts by weight a hiding or pigmenting effect of the magnesium oxide becomes apparent, the wrapping sheets passing from transparent and semi-transparent condition to opaque. As the proportion of magnesium oxide goes below 2 parts, decomposition of the rubber hydrochloride increases, resulting in the color of the sheets becoming increasingly darker. The hexamethylene tetramine used in the formula is preferred because it has heat stabilizing ability in addition to being a photochemical inhibitor. Hexa or other photochemical inhibitors, however, are not essential in the formula, self-sustaining transparent sheets being obtained without their use. The butyl stearate is also the preferred plasticizer, but other plasticizers for rubber hydrochloride may be used such as coumarone resins, opal wax, chlorinated paraffin. The plasticizers may be left out of the formula but for commercial permanently flexible wrapping sheets it should be used. The paraffin given in the formula is not essential, being used to give a gloss to the sheet and to improve moisture resistance. The petrol blue or other blue dye is used to overcome the slight amber tinge of the rubber hydrochloride, thus improving the transparency of the sheet in that it allows colored objects to be seen through the sheet in more nearly their true colors.

The formula is compounded by fluxing the rubber hydrochloride with the other ingredients in a mixing mill.

In order to obtain transparent, self-sustaining wrapping paper the stabilized mixture is run through calender rolls, preferably heated at around 170° F., and rolled to a thickness of approximately .001". The preferred thickness for wrapping paper is .0009-.0012". Substantially high pressures and temperatures sufficient to cause flowing are necessary to obtain thin sheets.

Transparent self-sustaining wrapping paper may also be produced by the following formula:

Example II

| | Parts by weight |
|---|---|
| Rubber hydrochloride (amorphous) | 100 |
| Sodium carbonate | 3 |
| Hexamethylene tetramine | 2 |
| Opal wax | 5 |
| Petrol blue | .005 |

The following example will illustrate the invention as applied to the production of thin flexible, opaque, solvent and oil resistant sheets adaptable for shade cloth, table cloth, and for laminating purposes:

Example III

| | Parts |
|---|---|
| High temperature insoluble type rubber hydrochloride | 100 |
| Titanium dioxide (rayox) | 100 |
| Opal wax | 10 |
| Magnesium oxide | 15 |
| Hexamethylene tetramine | 2 |
| Cumarone resin | 5 | were fluxed together on hot differential rolls and calendered into sheets of approximately .001" thickness. The sheets, in addition to oil, ozone and solvent resistance, are substantially free of acid and may be laminated, by pressure or otherwise, on cloth, paper and the like without harmful effect to the base. The nonacidic, heat stable character of the sheets is due to the incorporation of heat stabilizers such as magnesium oxide during the fluxing of the rubber hydrochloride. Where large amounts of inert fillers are to be added to a rubber hydrochloride the use of a milling type of mixing is almost essential, but hitherto the milling of inert fillers with rubber hydrochloride has enhanced the decomposition of the rubber hydrochloride and so has not been done. The present invention involving the use of heat stabilizers, therefore, is of particular value in producing stable, nonacidic rubber hydrochloride compositions having large amounts of inert, insoluble filler. With heat stabilizers it is possible to actually flux the rubber hydrochloride without substantial decomposition, thereby giving more homogeneous compositions than hitherto obtained, and compositions, according to my observation, which are substantially different than those obtained by stirring solvent mixtures and evaporating the solvent.

Example IV

The following example will further illustrate the invention as applied to the production of homogeneous plastic compositions containing large proportions of fillers:

| | Parts by weight |
|---|---|
| Crystalline rubber hydrochloride | 100 |
| Barytes | 200 |
| Magnesium oxide | 15 | are fluxed together in a mixing mill until a homogeneous mixture is obtained. The homogeneous mixture was molded at 288° F. for three minutes into tiles. Such tiles are adapted for flooring, wall panels, and the like. Other fillers such as wood flour, cork dust, whiting, rayox, asbestos fibres and the like may be used in place of barytes.

*Example V*

The following example will illustrate the invention as applied to the manufacture of dielectric plates:

| | Parts by weight |
|---|---|
| Amorphous saturated rubber hydrochloride | 100 |
| MgO | 30 |
| Hexamethylene tetramine | 2 | were prepared by the usual milling operation. The product was then molded at 288° F. for five minutes into plates. These plates have high dielectric strength, are not attacked by ozone. They are particularly suitable for use in ozonizers.

*Example VI*

The following example illustrates the invention as applied to the manufacture of tubes, one of the most important applications of rubber hydrochloride:

| | |
|---|---|
| Saturated crystalline rubber hydrochloride | 100 |
| Magnesium oxide | 10 |
| Litharge | 25 |
| Whiting (Cliffstone) | 140 |
| Opal wax | 5 |
| Cumar | 5 |
| Hexamethylene tetramine | 1 |
| Sulfur | 7 |
| Butyr aldehyde—aniline | 5 | were compounded by the usual milling operation. The compound was then forced through a tubing machine. A tough, oil and ozone resistant thermoplastic tube was formed, its flexibility depending on the amount of plasticizers such as opal wax and cumar. A soft, resilient, elastic nonthermoplastice tube was produced by heating the first tube at 300° F. for one hour. In this case the sulfur and butyr-aldehyde accelerator combine with the rubber hydrochloride under the influence of heat to form a new product as disclosed in greater detail in my copending application, Serial No. 22,431, filed May 20, 1935.

*Example VII*

A gasket was prepared from the following compound:

| | |
|---|---|
| High temperature insoluble type rubber hydrochloride | 100 |
| Thermatomic carbon | 40 |
| Magnesium oxide | 15 |
| Opal wax | 5 |
| Hexamethylene tetramine | 2 |
| Sulfur | 7 |
| Butyr aldehyde | 5 |

This compound was fluxed into a homogeneous mixture on different rolls, sheeted, and sheets of the proper size subjected to heat and pressure sufficient to flow the mass into the form of a ring. The mold and compound were then heated fifty minutes at 298° F. At this time the gasket was removed from the mold and found to be well vulcanized, i. e., transformed into an elastic, relatively non-thermoplastic condition.

*Example VIII*

| | |
|---|---|
| Saturated amorphous non-gelling rubber hydrochloride | 100 |
| Magnesium oxide | 3 |
| Glycerol phthalate resin (resyl) | 50 |
| Paraffin | 2 |
| Hexamethylene tetramine | 2 |
| Titanium dioxide (rayox) | 100 | are fluxed and milled for about fifteen minutes, or until a rubber hydrochloride of substantially reduced viscosity is obtained. The mixture is added to 300 parts of toluene and agitated until a liquid solution is obtained. I have found that when saturated amorphous rubber hydrochlorides are milled with magnesium oxide that the viscosity of the rubber hydrochloride is markedly reduced without the saturation of the compound being materially reduced. Such flowable solutions of high solid content are partially adapted for coating paper to produce washable shade cloth.

From the foregoing examples it will be apparent that the present invention is of commercial value not only in the field of plastics but in liquid coating compositions. The invention is applicable to all types of halogen containing rubber derivatives but it is of particular value for rubber hydrochlorides. The rubber hydrochloride to choose will depend on the use for the product. For lacquer and paints the amorphous, soluble type non-gelling product is preferred. For molded and like products which must withstand oil and gasoline the crystalline type substantially saturated rubber hydrochloride is preferable. For molded and like products which must be resistant to hot oils, benzol, benzol-gasoline mixtures, the high temperature insoluble type saturated rubber hydrochloride obtained by reacting solid rubber with gaseous hydrogen chloride at temperatures of viz. 110° C. should be used. The invention is particularly applicable to this high temperature product because its higher flow point makes it extremely difficult to "make" on a mill. The basic inorganic stabilizers aid greatly in the "making" of this product, as well as acting as stabilizers.

It is to be understood that the term "rubber" unless otherwise limited is employed in the appended claims in a generic sense to include natural rubber, synthetic rubber, reclaimed rubber, scrap rubber and like products. By amorphous material is meant material which is noncrystalline by X-ray analysis. Amorphous materials show a typical pattern by X-ray photography. By the term "milling" is meant the mastication of an undisaggregated mass by mixing rolls or kneaders by means of which the mass is converted into a plastic state so that it may be changed in shape or incorporated with other materials without being first disaggregated by solvents. The mass may be dry or may contain small amounts of solvents insufficient to bring about a liquid solution. It is within the scope of the present invention, however, that stabilizers may be incorporated with the rubber hydrochloride by mixing in solution followed by evaporation of the solvents, but such is not the preferred method, and with inorganic stabilizers especially is apt to give non-homogeneous mixtures. However, by such methods it is possible to produce light colored substantially undecomposed molded products.

It is also within the bounds of this invention to mix powdered rubber hydrochloride with stabilizers and other materials, and then roll or mold the mixture under the influence of heat into useful articles.

Numerous details of the process and composition may be varied through a wide range without departing from the principles of this invention and it is, therefore, not intended to limit the patent granted hereon otherwise than necessitated by the prior art.

With partially saturated rubber hydrochlorides the amount of stabilizer and efficiency of the stabilizer may be less than for the saturated rubber hydrochlorides. With rubber chlorides the amount and efficiency of the stabilizer must be much greater. The most valuable products from the point of view of lightness of coloration, tensile strength, low elongation, oil and ozone resistance are those made by milling, molding, calendering or extruding the stabilized substantially saturated rubber hydrochlorides, particularly the saturated crystalline rubber hydrochlorides. The invention, therefore, is valuable for all halogen containing rubber derivatives but of particular value for rubber hydrochlorides having at least 70% saturation, and preferably for rubber hydrochlorides of nearly complete saturation, such as may be made from solid sheet rubber and hydrogen chloride. With solid sheet rubber it is believed that at least some of the molecules are completely saturated due to the nature of the reaction which takes place from the outside inwardly. Therefore, the term "saturated rubber hydrochloride" will always include the rubber hydrochloride made from undissolved sheet rubber.

The amount of stabilizer required to retard heat disintegration of a halogen containing rubber derivatives varies as has been heretofore pointed out, according to the kind of stabilizer, the type of halogen containing rubber derivative, and the degree of heat and time of treatment. The basic stabilizer should be added in amount sufficient to produce appreciable retarding of heat disintegration during heat treatment, and should also preferably be added in excess of the amount required to bind the hydrogen chloride reacting with it during the heat treatment in order that the manufactured products will also be maintained in acid free condition throughout their use. The time and temperature of milling, molding and extruding should also be such that the stabilizer is not entirely consumed, and the amount of metallic halides produced is a minimum. With saturated rubber hydrochlorides and magnesium oxide the heat disintegration due to ordinary milling is appreciably retarded and the gas evolution practically prevented when the amount of magnesium oxide stabilizer is as low as two parts per 100 parts of rubber hydrochloride by weight. With calcium oxide as a heat stabilizer the proportion used should be higher as, for example 5%, or the calcium oxide used in conjunction with other stabilizers such as hexamethylene tetramine so that the total amount of stabilizers is around 5 parts or more by weight. With other stabilizers such as hexamethylene tetramine, lead oxide, sodium carbonate, the amount used for good results should be considerably higher than for magnesium oxide as, for example, 10 parts or more of stabilized per 100 parts of rubber hydrochloride.

It should be understood that in all the examples the preferred method of adding the stabilizer is to add it to the rubber hydrochloride. The rubber hydrochloride is wrapped around the rolls and the stabilizer, viz., light powdered magnesium oxide, is spread over the rubber hydrochloride. The mixture is then milled, the stabilizers of a powdered type aiding in the "making" of the product on the mill. Other compounding ingredients are then added. This method of incorporating the stabilizer with the rubber hydrochloride gives improved results to incorporating the stabilizer with, for example, the rubber prior to reaction with hydrogen chloride. For quick removal of occluded hydrogen chloride and for the efficient retardation or prevention of dark coloration the magnesium oxide should be present on the outside of the rubber hydrochloride rather than dispersed so that it is surrounded by the rubber hydrochloride. Furthermore, the presence of a chloride and particularly hygroscopic chlorides such as magnesium chloride which are formed in large amounts when the basic stabilizers are added in the rubber which is then reacted with hydrogen chloride, makes milling difficult and is detrimental to vulcanization in molded and like articles of manufacture. This is particularly true where the basic stabilizer has been added to the rubber so it is in a major proportion compared to the rubber. Preferably the basic stabilizers which form hygroscopic metallic halides should be present in small amount, as below 30 parts on the rubber. The invention, however, is not limited to the incorporation of the stabilizer at any particular time or in any particular amount except as may be stated in the claims.

The present application is a continuation in part of my copending application, Serial No. 11,665, filed March 18, 1935.

I claim:

1. The method which comprises fluxing a rubber hydrohalide with elemental sulfur.

2. The method which comprises milling a rubber hydrohalide with elemental sulfur.

3. The method of making molded, extruded, and like formed articles of manufacture which comprises subjecting a substantially solid mixture of a rubber hydrohalide and elemental sulfur to heat and pressure sufficient to flow the mixture into shape.

4. The method which comprises fluxing a rubber hydrohalide under the influence of heat and positive pressure in admixture with a substance selected from the group consisting of elemental sulfur and lead.

5. The method of intimately incorporating ingredients into high chlorine containing rubber hydrochloride in the dry state, without substantially decomposing the rubber hydrochloride which comprises fluxing said rubber hydrochloride under the influence of heat and positive pressure in admixture with a substance selected from the group consisting of elemental sulfur and lead, and milling into said mixture said ingredients.

6. The method which comprises fluxing a rubber hydrochloride in admixture with elemental lead under the influence of heat and positive pressure.

HERBERT A. WINKELMANN.

CERTIFICATE OF CORRECTION.

Patent No. 2,075,251. March 30, 1937.

HERBERT A. WINKELMANN.

It is hereby certified that error appears in the printed specification of the above numbered patent requiring correction as follows: Page 1, first column, line 50, for "urbber" read rubber; page 2, second column, line 35, for "is" read in; page 4, first column, line 70, for "main" read maintain; page 6, first column, line 46, for "nonthermoplastice" read nonthermoplastic; page 7, first column, line 68, for "stabilized" read stabilizer; and that the said Letters Patent should be read with these corrections therein that the same may conform to the record of the case in the Patent Office.

Signed and sealed this 25th day of May, A. D. 1937.

(Seal)

Henry Van Arsdale
Acting Commissioner of Patents.